United States Patent
Moreno et al.

(10) Patent No.: US 6,871,668 B2
(45) Date of Patent: Mar. 29, 2005

(54) VARIABLE FORCE ACTUATOR WITH A DOUBLE NEEDLE POPPET ASSEMBLY

(75) Inventors: Alejandro Moreno, El Paso, TX (US); Conrado Carrillo, Chihuahua (MX)

(73) Assignee: Delphi Technologies Inc., Troy, MI (US)

( * ) Notice: Subject to any disclaimer, the term of this patent is extended or adjusted under 35 U.S.C. 154(b) by 0 days.

(21) Appl. No.: 10/341,194

(22) Filed: Jan. 13, 2003

(65) Prior Publication Data

US 2004/0134547 A1 Jul. 15, 2004

(51) Int. Cl.[7] .............................................. F15B 13/044
(52) U.S. Cl. ........................... 137/625.27; 137/329.04; 137/625.65
(58) Field of Search ....................... 137/329.04, 625.27, 137/625.65

(56) References Cited

U.S. PATENT DOCUMENTS

| | | | | |
|---|---|---|---|---|
| 3,194,266 A | * | 7/1965 | Abbott et al. | 137/625.27 |
| 3,244,193 A | * | 4/1966 | Loveless | 137/625.27 |
| 3,762,443 A | * | 10/1973 | Sorenson | 137/625.27 |
| 4,237,931 A | * | 12/1980 | Rafaely | 137/625.27 |
| 5,007,458 A | * | 4/1991 | Marcus et al. | 137/625.5 |
| 5,152,320 A | | 10/1992 | Zimmerly | 137/625.5 |
| RE34,261 E | * | 5/1993 | Sule | 137/625.65 |
| 6,123,096 A | * | 9/2000 | Kammonen | 137/625.27 |
| 6,213,447 B1 | | 4/2001 | Bircann et al. | |
| 6,230,742 B1 | | 5/2001 | Bircann | |
| 6,435,168 B1 | | 8/2002 | Bircann et al. | |
| 6,438,473 B1 | | 8/2002 | Barta et al. | |
| 6,497,225 B1 | | 12/2002 | Bircann et al. | |
| 6,604,542 B1 | | 8/2003 | Bircann et al. | |

FOREIGN PATENT DOCUMENTS

| | | |
|---|---|---|
| FR | 1020134 A | 2/1953 |
| FR | 2823282 A | 10/2002 |
| WO | 0186178 A | 11/2001 |

* cited by examiner

Primary Examiner—Gerald A. Michalsky
(74) Attorney, Agent, or Firm—Jimmy L. Funke

(57) ABSTRACT

A variable force actuator with a double needle poppet assembly includes a housing in which a first poppet and a second poppet are slidably disposed. The second poppet fits within the first poppet, and both poppets move when a nearby coil is energized to establish, in combination, a fluid flow configuration in response to the amount of energy applied to the coil.

12 Claims, 2 Drawing Sheets

VARIABLE FORCE ACTUATOR WITH A DOUBLE NEEDLE POPPET ASSEMBLY

TECHNICAL FIELD

The present invention relates to solenoids and actuators.

BACKGROUND OF THE INVENTION

Automobiles are equipped with numerous actuators designed to control the flow of fluid to and from different components of the vehicle, e.g., brakes, transmission, ride control system, traction control system, etc. Often, it is necessary to regulate fluid pressure or flow from a constant supply to a controlled volume. This can be accomplished using a variable flow orifice, i.e., a fluid path within an actuator in which the restriction of fluid flow can be varied as a function of armature travel.

Variable flow orifices are integral to the performance of variable bleed solenoids (VBS) and variable flow solenoids (VFS). Many VBS and VFS actuators have utilized a poppet and ball configuration to produce linear flow and pressure control through the actuators. Unfortunately, using a ball limits the design flexibility for variable orifice control due to its shape. Also, the ball is allowed to float within the actuator which can produce considerable variation in the performance of the actuator.

The present invention has recognized these prior art drawbacks, and has provided the below-disclosed solutions to one or more of the prior art deficiencies.

SUMMARY OF THE INVENTION

An actuator includes a housing in which a first poppet is slidably disposed. A second poppet is also slidably disposed within the housing adjacent to the first poppet. The second poppet is engageable with the first poppet and the first poppet is engageable with a seat of the housing to establish a fluid flow configuration.

In a preferred embodiment, the second poppet is identical to the first poppet. Also, the housing forms a supply port, a control port, and an exhaust port. The first poppet and the second poppet are movable to block flow through one or more of the ports. Preferably, the first poppet and the second poppet are movable between a de-energized configuration, plural partially energized configurations, and a fully energized configuration. In the de-energized normally low, configuration, flow is prohibited between the supply port and the control port, prohibited between the exhaust port and the supply port, and permitted between the control port and the exhaust port. In the plural partially energized configurations, flow is permitted between the supply port and the control port, between the control port and the exhaust port, and between the exhaust port and the supply port. In the fully energized configuration, flow is prohibited between the control port and the exhaust port and flow is permitted between the supply port and the control port.

In a preferred embodiment, the actuator further includes a first poppet seat and a second poppet seat. Each poppet is configured to engage both poppet seats. Preferably, each poppet includes a proximal end, a distal end, and a poppet head therebetween. The poppet head is configured to engage the first poppet seat and the second poppet seat. Moreover, in a preferred embodiment, the proximal end of each poppet includes a nipple that extends therefrom. Preferably, the distal end of each poppet forms a bore that is sized to receive the nipple and the nipple of the first poppet engages the bore of the second poppet.

Preferably, the poppet head of each poppet forms a first frusto-conical surface and a second frusto-conical surface. The first frusto-conical surface of each poppet is configured to engage the second poppet seat and the second frusto-conical surface of each poppet is configured to engage the first poppet seat.

In another aspect of the present invention, an actuator includes a housing that forms a supply port, a control port, and an exhaust port. A first poppet is slidably disposed within the housing and a second poppet is slidably disposed within the housing adjacent to the first poppet. The first poppet and the second poppet are movable between a de-energized configuration, plural partially energized configurations, and a fully energized configuration. In the de-energized configuration flow is prohibited between the supply port and the control port, prohibited between the exhaust port and the supply port, and permitted between the control port and the exhaust port. In the plural partially energized configurations, flow is permitted between the supply port and the control port, between the control port and the exhaust port, and between the exhaust port and the supply port. In the fully energized configuration, flow is prohibited between the control port and the exhaust port and flow is permitted between the supply port and the control port.

In yet another aspect of the present invention, a fluid control system includes a fluid supply, a hydraulically controlled device, a fluid exhaust and an actuator that is in fluid communication with the fluid supply, the hydraulically controlled device and the fluid exhaust. The actuator includes a first poppet that is slidably disposed within the housing and a second poppet that is slidably disposed within the housing adjacent to the first poppet.

The present invention will now be described, by way of example, with reference to the accompanying drawings, in which:

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
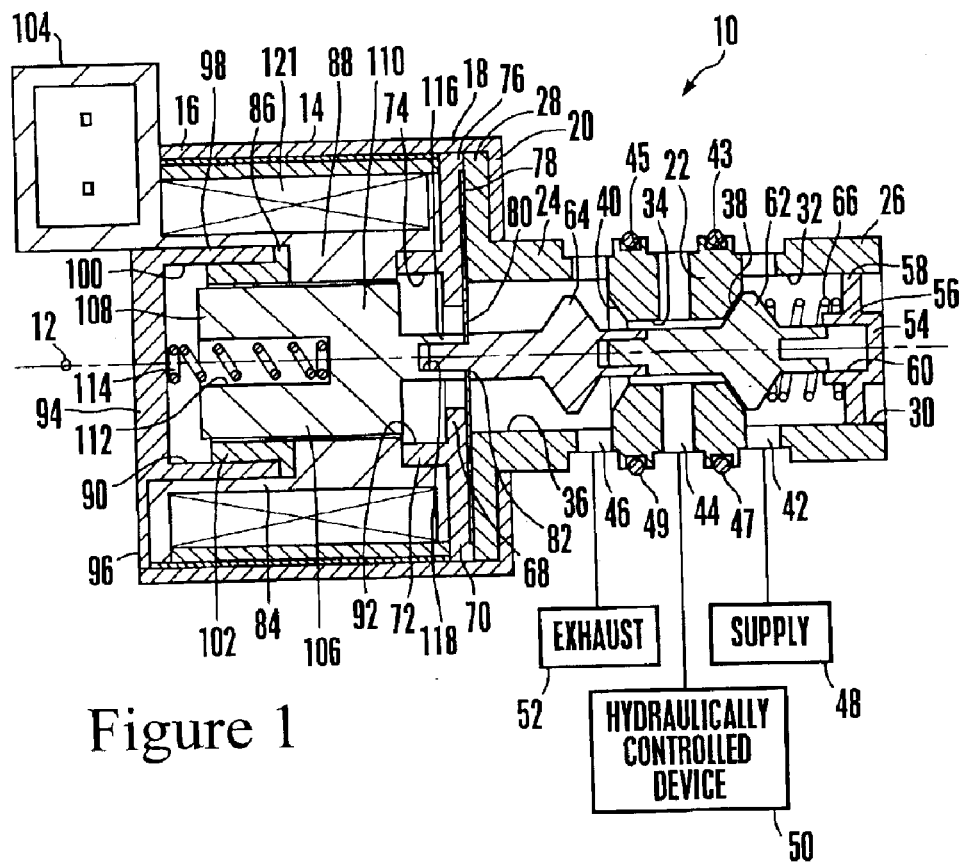
FIG. 1 is a cross-section view of a normally low, variable force actuator with a double needle poppet assembly in a de-energized configuration.

Referring initially to FIG. 1, a normally low, variable force actuator with a double needle poppet assembly is shown and generally designated 10. As shown, the actuator 10 defines a longitudinal axis 12 and preferably includes a hollow, generally cylindrical frame 14 that defines an open proximal end 16 and an open distal end 18 that is circumscribed by an internal lip 20. FIG. 1 shows that the preferred actuator 10 also includes a housing 22 that defines a proximal end 24 and a distal end 26. The proximal end 24 of the housing 22 can be circumscribed by a flange 28 that has an external diameter approximately equal to the internal diameter of the frame 14. The housing 22 may be disposed within the frame 14 such that the distal end 26 of the housing 22 protrudes through and extends beyond the distal end 18 of the frame 14. Also, the flange 28 of the housing 22 can abut the internal lip 20 of the frame 14.

Moreover, FIG. 1 shows that a generally cylindrical bore 30 can be formed through the housing 22 along the longitudinal axis 12. The bore 30 may include a relatively large diameter first portion 32 that narrows to a second portion 34. As shown, in a preferred non-limiting embodiment, the second portion 34 expands to a relatively large diameter third portion 36. Moreover, a first poppet seat 38 can be formed at the transition between the first portion 32 and second portion 34 of the housing bore 30. A second poppet seat 40 can be formed at the transition between the second portion 34 and third portion 36 of the housing bore 30.

As shown in FIG. 1, a supply port 42 can be formed in the housing 22 leading to the housing bore 30, preferably the first portion 32 thereof. Preferably, a control port 44 can extend through the housing 22 to the second portion 34 of the housing bore 30 between the first poppet seat 38 and the second poppet seat 40. Also, an exhaust port 46 may lead to the housing bore 30, specifically the third portion 36 thereof. As shown, a fluid supply 48, e.g., a pump, can be connected to the supply port 42. Moreover, a hydraulically controlled device 50, e.g., a brake cylinder, can be connected to the control port 44. An fluid exhaust 52, e.g., a reservoir, can be connected to the exhaust port 46.

FIG. 1 further shows a first O-ring groove 43 formed between the supply port 42 and the control port 44. Also, second O-ring groove 45 is formed between the control port 44 and the exhaust port 46. A first O-ring 47 is installed within the first O-ring groove 43 and a second O-ring 49 is installed in the second O-ring groove 45. The O-rings 47, 49 insulate the ports 42, 44, 46 from each other.

As shown in FIG. 1, a spring retainer 54 can be disposed within the first portion 32 of the housing bore 30 at the distal end 26 of the housing 22. Preferably, the spring retainer 54 includes a central hub 56 having a flange 58 that extends radially from the central hub 56. The spring retainer flange 58 engages the wall of the first portion 32 of the housing bore 30 in order to hold the spring retainer 54 within the housing bore 30. FIG. 1 shows that the central hub 56 of the spring retainer 54 can be formed with a central bore 60. It can be appreciated that the spring retainer 54 can be moved along the central axis 12 in either direction in order to calibrate the actuator 10.

Preferably, a first poppet 62 and a second poppet 64 are slidably disposed within the housing bore 30 for purposes to be disclosed shortly. The poppets 62, 64 are described in detail below. Also, a preferably coil-shaped spring 66 can be installed in compression between the first poppet 62 and the spring retainer 54. As described in detail below, when the actuator 10 is de-energized the spring 66 pushes the first poppet 62 against the first poppet seat 38 so that it engages the first poppet seat 38 to block fluid flow therethrough.

As further shown in FIG. 1, a primary bobbin plate 68 can be disposed within the frame 14 adjacent to the proximal end 24 of the housing 22. As shown, the primary bobbin plate 68 can include a base 70 and a hub 72 that extends from the base 70 toward the middle of the frame 14. Preferably, the base 70 of the primary bobbin plate 68 engages the inner wall of the frame 14 so that it does not move with respect to the frame 14. Also, the primary bobbin plate 68 is formed with a central bore 74 through which the end of a plunger, described below, extends. In a preferred embodiment, a circular rib 76 extends from the base 70 of the primary bobbin plate 68 such that a diaphragm spring pocket 78 is established within the circular rib 76 between the primary bobbin plate 68 and the housing flange 22.

FIG. 1 shows that a flat, generally disk-shaped diaphragm spring 80 can be installed adjacent to the proximal end of the housing 22 within the spring pocket 78 established by the primary bobbin plate 68. Preferably, the diaphragm spring 80 is formed with a central bore 82 aligned with the axis 12.

FIG. 1 further shows that in a preferred, non-limiting embodiment, a generally "I" shaped bobbin 84 may also be disposed within the frame 14. As shown, the bobbin 84 can be formed with a central bore 86. A flange 88 may extend inwardly from the wall of the bore 86 and divide the bore into a proximal portion 90 and a distal portion 92. Preferably, the distal portion 92 of the bobbin bore 86 fits around the primary bobbin plate hub 72. A secondary bobbin plate 94 is also shown and, in a preferred embodiment, includes a base 96 and a hub 98 that extends from the base 98. In a preferred embodiment, the hub 98 of the secondary bobbin plate 94 fits into the proximal portion 90 of the bobbin bore 86. Moreover, the secondary bobbin plate 94 is preferably formed with a generally cylindrical central bore 100 along the longitudinal axis 12. Preferably, a hollow, generally cylindrical bushing 102 is installed within the central bore 100 of the secondary bobbin plate 94.

As shown in FIG. 1, a connector housing 104 can be integrally formed with the bobbin 84. The connector housing 104 can be sized and shaped to receive a complementary sized and shaped connector (not shown). Moreover, in a preferred, non-limiting embodiment, a solid, generally cylindrical armature 106 is slidably disposed within the actuator 10, specifically within the bushing 102 and the bobbin flange 88. The armature 106 defines a proximal end 108 and a distal end 110. Preferably, the proximal end 108 of the armature 106 is formed with a spring pocket 112 in which a coil spring 114 is installed in compression between the secondary bobbin plate 94 and the armature 106. Also, a distal rod 116 preferably extends from the distal end 110 of the armature 106. The distal rod is formed with a central bore 118 that is sized and shaped to receive the proximal end of the second poppet 64, described in detail below.

FIG. 1 also show that in a preferred, non-limiting embodiment, a generally toroidal coil 121 surrounds the bobbin 84. The coil 121 can be magnetically coupled to the armature 106 and when it is energized and de-energized it causes the actuator 10 to operate as described below.

Figure 2:
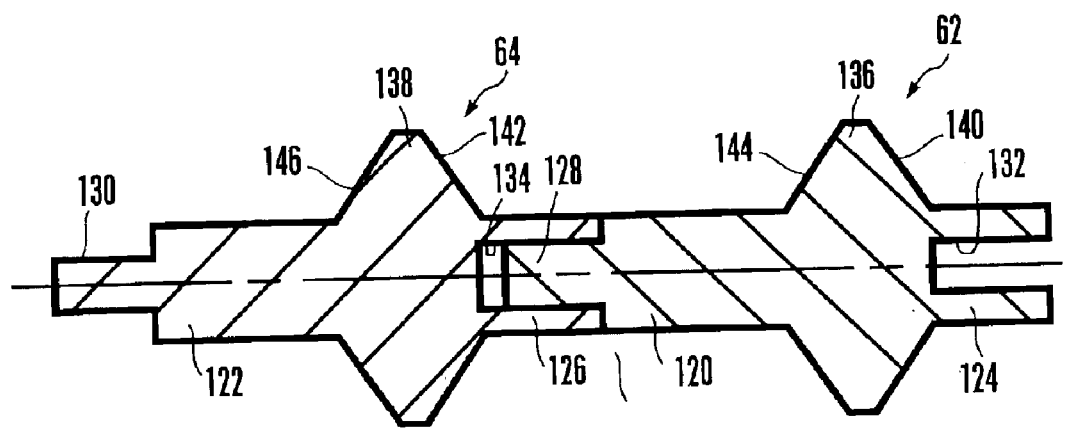
FIG. 2 is a detailed cross-section view of the double needle poppet assembly.

Referring now to FIG. 2, details regarding the construction of the first poppet 62 and second poppet 64 are shown. FIG. 2 shows that the first poppet 62 and second poppet 64 are identical in construction and each includes a respective proximal end 120, 122 and a distal end 124, 126. As shown, a preferably cylindrical nipple 128, 130 extends from the proximal end 120, 122 of each poppet 62, 64. Also, the distal end 124, 126 of each poppet 62, 64 is formed with a central bore 132, 134 that is aligned with the longitudinal axis 12. It is to be understood that the nipple 128, 130 of either poppet 62, 64 is sized and shaped to fit into the central bore 132, 134 of another poppet 62, 64 having the same construction as shown.

Also, the nipple 130 of the second poppet 64 is sized and shaped so that it fits through the central bore 82 (FIG. 1) of the diaphragm spring (FIG. 1) and fits into the bore 118 (FIG. 1) formed by the distal rod 116 (FIG. 1) that extends from the distal end 110 (FIG. 1) of the armature 106 (FIG. 1). Accordingly, the diaphragm spring 80 (FIG. 1) is sandwiched between the distal rod 116 (FIG. 1) of the armature 106 (FIG. 1) and the proximal end 122 of the second poppet 64.

Returning to the detailed description of the poppets 62, 64, it is shown that the preferred embodiment of each poppet is formed with poppet head 136, 138 having a first frusto-conical surface 140, 142 and a second frusto-conical surface 144, 146. These frusto-conical surfaces 140, 142, 144, 146 are sized and shaped to engage the first and second poppet seats 38, 40 (FIG. 1). The first frusto-conical surface 140, 142 of each poppet 62, 64 can be oriented at an angle equal to or different from the second frusto-conical surface 144, 146 of each poppet 62, 64.

Operation

Initially, when the coil 121 is de-energized, as shown in FIG. 1, the actuator 10 is in a de-energized configuration, wherein the diaphragm spring 80 is relaxed, i.e., it is not deflected along the longitudinal axis 12. In this configuration, the head 136 of the first poppet 62 is seated against the first poppet seat 38 to block flow from the supply port 42 to the control port 44 and the exhaust port 46. Specifically, the second frusto-conical surface 144 of the first poppet 62 engages the first poppet seat 38. In the de-energized configuration, the head 138 of the second poppet 64 is distanced a maximum distance from the second poppet seat 40 to allow fluid flow between the control port 44 and the exhaust port 46. Specifically, the first frusto-conical surface 142 formed by the second poppet 64 is distanced from the second poppet seat 40.

Figure 3:
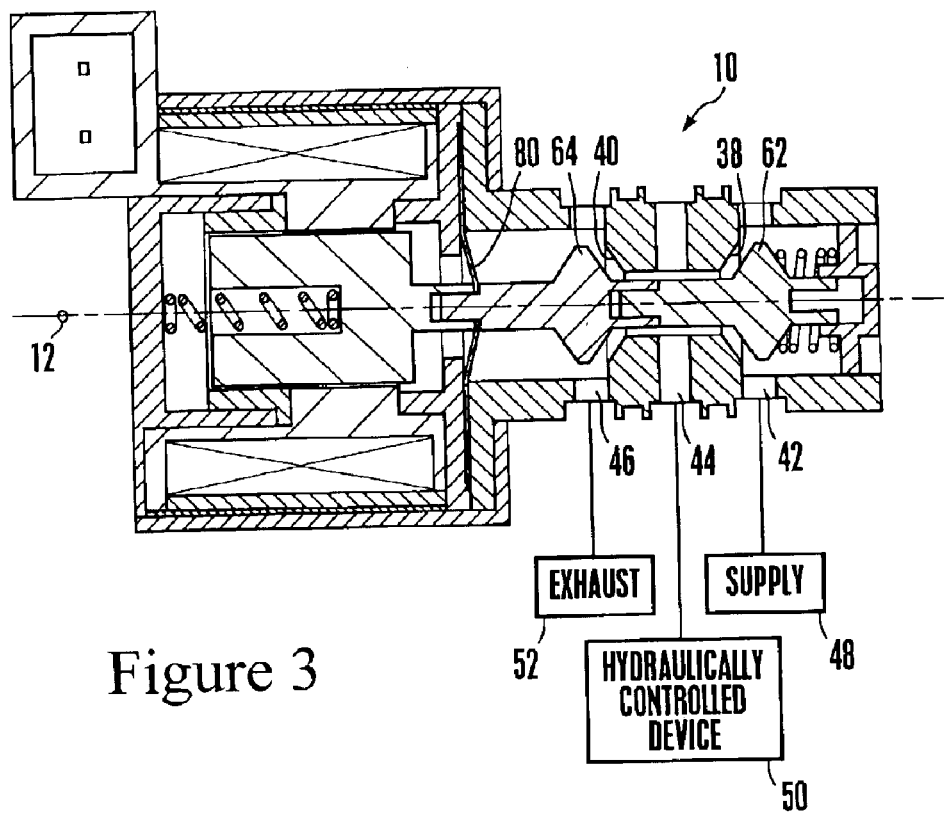
FIG. 3 is a cross-section view of the actuator in a partially energized configuration.

When the actuator is in a partially energized configuration, shown in FIG. 3, the coil 121 is partially energized and the armature 106 moves to the right, looking down at FIG. 3, and this deflects the diaphragm spring 80 and compresses the first coil spring 66. The armature 106 also moves the second poppet 64 toward the second poppet seat 40 such that the distance between the second poppet 64 and the second poppet seat 40 is decreased. The second poppet 64 pushes the first poppet 62 to the right, looking at FIG. 2, compresses the first coil spring 66, and unseats the first poppet 62 from the first poppet seat 38 so that fluid flow is permitted between the supply port 42, the control port 44, and the exhaust port 46.

As the current applied to the actuator 10 increases toward a predetermined upper threshold the armature 106 continues to move to the right which, in turn, continues to move the second poppet 64 toward the second poppet seat 40 and thus, decreases the distance between the second poppet 64 and the second poppet seat 40. This movement produces an incremental change on the flow rate between the control port 44 and the exhaust port 46. It is to be understood that, theoretically, there are an infinite number of partially energized configurations for the actuator 10 between the de-energized configuration and the fully energized configuration, described below.

Figure 4:
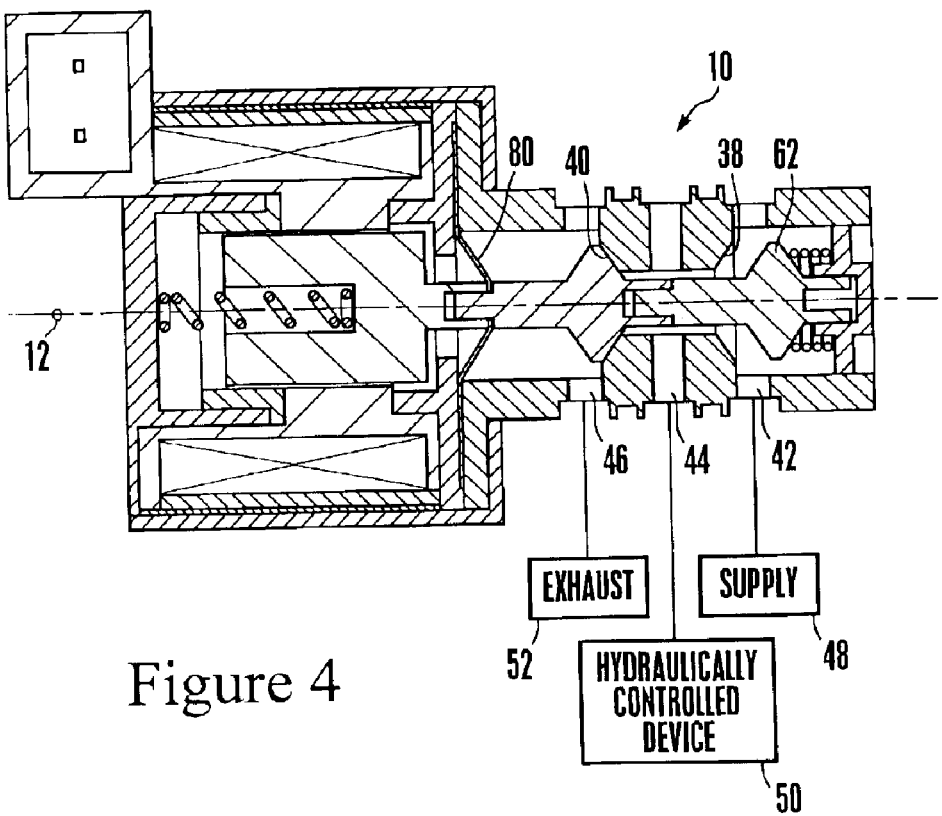
FIG. 4 is a cross-section view of the actuator in a fully energized configuration.

When the actuator 10 is in the fully energized configuration, shown in FIG. 4, the current applied to the coil 121 has reached the predetermined upper threshold. In this configuration, the armature 121 reaches its maximum displacement, as shown in FIG. 4, wherein the second poppet 64 engages the second poppet seat 40 to block fluid flow between the supply port 42 and the exhaust port 46 and fluid flow between the control port 44 and the exhaust port 46. In this configuration, the fluid flow between the supply port 42 and the control port 44 is maximized and fluid flow to the exhaust port 46 is minimized.

As the current applied to the actuator 10 decreases, the diaphragm spring 80 and the first coil spring 66 move the first poppet 62, the second poppet 64, and the armature 106 to the left, looking at FIGS. 1, 3, and 4. When the actuator 10 is de-energized, the actuator returns to the configuration shown in FIG. 1.

With the configuration of structure described above, it is to be appreciated that the configuration of structure of the variable flow actuator with a double poppet assembly improves the alignment of the poppets 62, 64 and prevents buckling of the poppets 62, 64. Also, the alignment of the poppets relative to the ports 42, 44, 46 minimizes performance variations commonly found in valves in which the poppet or ball floats.

While the particular VARIABLE FLOW ACTUATOR WITH A DOUBLE NEEDLE POPPET ASSEMBLY as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

We claim:

1. An actuator, comprising;
   a housing; wherein the housing forms a supply port, a control port, and an exhaust port
   a first poppet having a proximal end having a nipple extending therefrom, a distal end, and a poppet head therebetween, said first poppet slidably disposed within the housing;
   a second poppet having a proximal end having a nipple extending therefrom, a distal end, and a poppet head therebetween, said second poppet slidably disposed within the housing adjacent to the first poppet, the second poppet being engageable with the first poppet and the first poppet being engageable with a seat of the housing to establish a fluid flow configuration, wherein the second poppet is identical to the first poppet, wherein the first poppet and the second poppet are movable between a de-energized configuration wherein flow is prohibited between the supply port and the control port, prohibited between the exhaust port and the supply port, and permitted between the control port and the exhaust port, plural partially energized configurations wherein flow is permitted between the supply port and the control port, between the control port and the exhaust port, and between the exhaust port and the supply port, and a fully energized configuration wherein flow is prohibited between the control port and the exhaust port and flow is permitted between the supply port and the control port;
   a first poppet seat;

a second poppet seat, each poppet head being configured to engage both poppet seats.

2. The actuator of claim 1, wherein the distal end of each poppet forms a bore that is sized to receive the nipple.

3. The actuator of claim 2, wherein the nipple of the first poppet engages the bore of the second poppet.

4. The actuator of claim 3, wherein the poppet head of each poppet forms a first frusto-conical surface and a second frusto-conical surface.

5. The actuator of claim 4, wherein the first frusto-conical surface of each poppet is configured to engage the second poppet seat.

6. The actuator of claim 5, wherein the second frusto-conical surface of each poppet is configured to engage the first poppet seat.

7. A fluid control system, comprising:

a fluid supply;

a hydraulically controlled device;

a fluid exhaust; and an actuator in fluid communication with the fluid supply, the hydraulically controlled device and the fluid exhaust, the actuator comprising:

a first poppet slidably disposed within the housing;

a second poppet slidably disposed within the housing adjacent to the first poppet, wherein the second poppet is identical to the first poppet;

a first poppet seat; and a second poppet seat, each poppet being configured to engage both poppet seats, wherein each poppet comprises:

a proximal end, including a nipple extending therefrom;

a distal end; and a poppet head therebetween, the poppet head being configured to engage the first poppet seat and the second poppet seat.

8. The fluid control system of claim 7, wherein the distal end of each poppet forms a bore that is sized to receive the nipple.

9. The fluid control system of claim 8, wherein the nipple of the first poppet engages the bore of the second poppet.

10. The fluid control system of claim 9, wherein the poppet head of each poppet forms a first frusto-conical surface and a second frusto-conical surface.

11. The fluid control system of claim 10, wherein the first frusto-conical surface of each poppet is configured to engage the second poppet seat.

12. The fluid control system of claim 11, wherein the second frusto-conical surface of each poppet is configured to engage the first poppet seat.

* * * * *